(12) United States Patent
Sakurai et al.

(10) Patent No.: US 7,388,725 B2
(45) Date of Patent: Jun. 17, 2008

(54) MAGNETIC RECORDING MEDIA, METHOD OF MANUFACTURING THE SAME AND MAGNETIC RECORDING APPARATUS

(75) Inventors: Masatoshi Sakurai, Tokyo (JP); Makoto Asakura, Tokyo (JP); Takeshi Okino, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 272 days.

(21) Appl. No.: 11/087,595

(22) Filed: Mar. 24, 2005

(65) Prior Publication Data

US 2005/0219730 A1   Oct. 6, 2005

(30) Foreign Application Priority Data

Mar. 31, 2004   (JP) .............................. 2004-108107

(51) Int. Cl.
*G11B 5/09*   (2006.01)
(52) U.S. Cl. ....................................... 360/48
(58) Field of Classification Search ..................... None
See application file for complete search history.

(56) References Cited

U.S. PATENT DOCUMENTS 6,469,852 B1   10/2002   Nakagawa

2001/0048566 A1*  12/2001  Hirano et al. ................. 360/48

FOREIGN PATENT DOCUMENTS

| EP | 0 459 265 A2 | 12/1991 |
|---|---|---|
| EP | 1463038 A2 * | 9/2004 |
| JP | 62-256225 | 11/1987 |
| JP | 2-301018 | 12/1990 |
| JP | 2004-295991 | 10/2004 |
| WO | WO 02/23538 A2 | 3/2002 |

OTHER PUBLICATIONS

U.S. Appl. No. 11/192,048, filed Jul. 29, 2005, Okino et al.
U.S Appl. No. 11/212,593, filed Aug. 29, 2005, Asakura et al.

* cited by examiner

*Primary Examiner*—Andrea Wellington
*Assistant Examiner*—Dan I Davidson
(74) *Attorney, Agent, or Firm*—Oblon, Spivak, McClelland, Maier & Neustadt, P.C.

(57) ABSTRACT

A magnetic recording media includes a servo region including a preamble region and a burst region and having marks of a magnetic film, and a data region having discrete tracks of the magnetic film. The burst region includes a signal section and a non-signal section, the signal section including rectangular marks of the magnetic film, in-plane geometry of which is a rectangle, formed in a periodic pattern in a track direction, and the non-signal section including marks of the magnetic film having a pattern different from the pattern of the rectangular marks in the signal section.

13 Claims, 9 Drawing Sheets

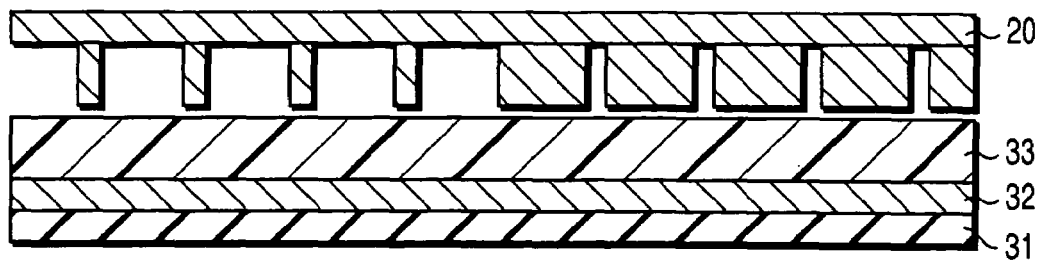
F I G. 2A
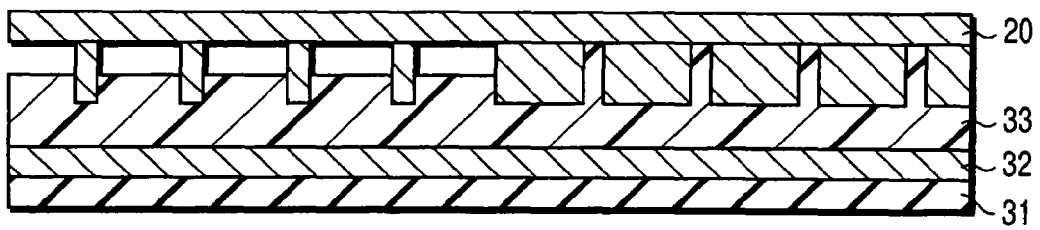
F I G. 2B
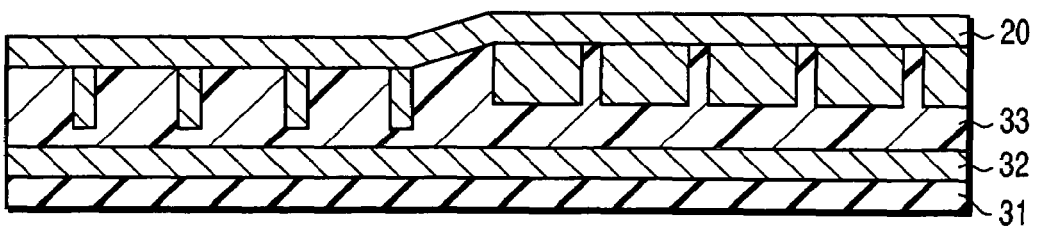
F I G. 2C
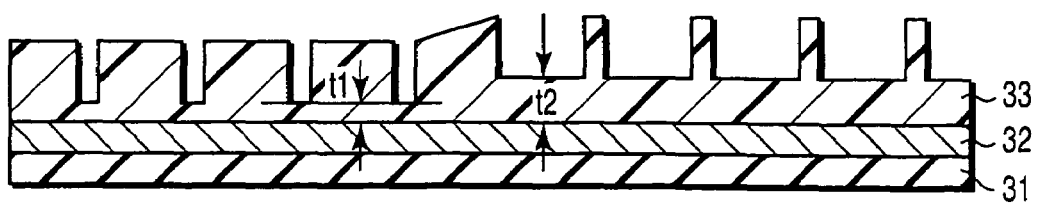
F I G. 2D

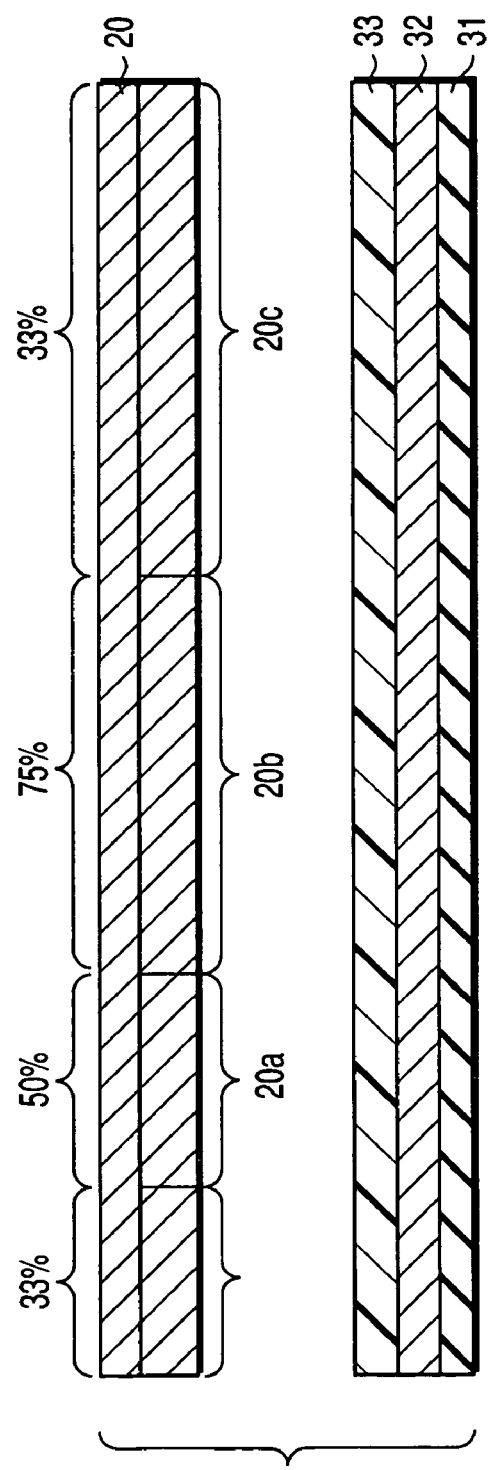
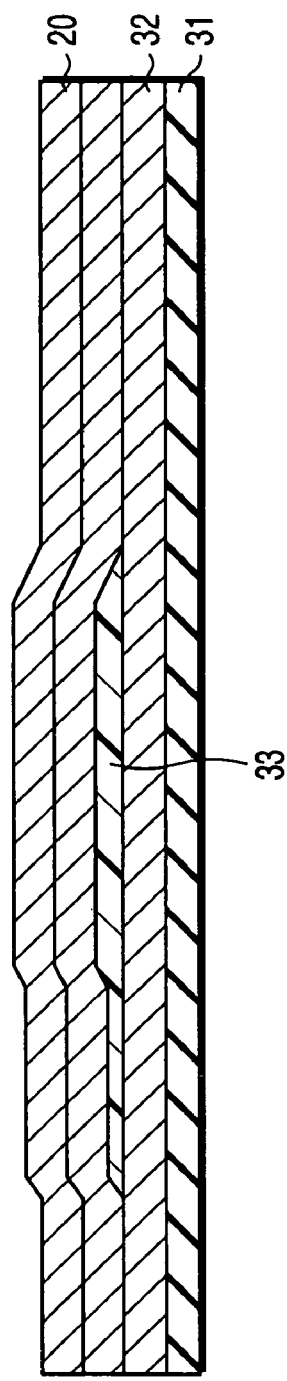
FIG. 3A
FIG. 3B

MAGNETIC RECORDING MEDIA, METHOD OF MANUFACTURING THE SAME AND MAGNETIC RECORDING APPARATUS

CROSS-REFERENCE TO RELATED APPLICATIONS

This application is based upon and claims the benefit of priority from prior Japanese Patent Application No. 2004-108107, filed Mar. 31, 2004, the entire contents of which are incorporated herein by reference.

BACKGROUND OF THE INVENTION

1. Field of the Invention

The present invention relates to a magnetic recording media, a method of manufacturing the recording media using imprint lithography, and a magnetic recording apparatus that uses the magnetic recording media.

2. Description of the Related Art

As demands for higher capacity of magnetic recording apparatuses, magnetic recording media are required to increase a recording density. Magnetic recording media with a high recording density have such a problem that, when data are recorded on a track with a magnetic head, data recorded on the adjacent tracks may be adversely affected with a high possibility. In order to solve the problem, there has been proposed a magnetic recording media, referred to as a discrete track media, in which tracks are formed of magnetic film that are physically discrete from each other in the track width direction. See, for example, Jpn. Pat. Appln. KOKAI Publication No. 62-256225.

Meanwhile, in the magnetic recording apparatus, the magnetic head positions itself with reading servo data from servo regions of the magnetic recording media. In the conventional magnetic recording media, the servo regions are magnetically recorded on the magnetic film using a servo track writer. On the other hand, it is preferable for the discrete track media that the magnetic film is processed to form servo marks in the servo regions as well as to form a pattern of the discrete tracks. Such a magnetic recording media, which is a type of a patterned media, should preferably be manufactured by using an imprint lithography method. Incidentally, when a size of the magnetic marks is reduced to about 500 nm or less, it is difficult to process the magnetic film into such a microstructure by photolithography. Electron-beam lithography enables to form the microstructure with a size of 500 nm or less. However, the electron beam lithography results in a low throughput because of slow drawing speed. In contrast, the imprint lithography method is advantageous, because the method permits to manufacture the patterned media at a high throughput.

A method of manufacturing a magnetic recording media, i.e., a patterned media, using imprint lithography will now be described.

First, an imprint stamper with a pattern of projections and recesses substantially reverse to that to be formed in the magnetic film on the magnetic recording media is prepared through, for example, the processes described below. An electron beam resist is applied to a master plate, and then a predetermined pattern is drawn to the resist by electron beam direct write. Development is performed to form a pattern of projections and recesses in the electron beam resist. The master plate on which the pattern of projections and recesses is formed in the electron beam resist is subjected to electroforming, and then the metal disk formed by electroforming is peeled off to prepare an imprint stamper.

Next, a magnetic recording media is prepared by using the imprint lithography method through, for example, the processes described below. That is, a magnetic film is formed on a substrate, and a resist is applied to the magnetic film. The imprint stamper is pressed against the resist to transfer the pattern of the projections and recesses on the surface thereof to the surface of the resist. After removing the imprint stamper, the magnetic film is processed using the resist to which the pattern has been transferred as a mask. Thus, a magnetic recording media, i.e., a patterned media, having a desired pattern of the magnetic film can be manufactured.

In the case where the imprint lithography method is used as described above, the imprint stamper prepared by using electron beam lithography can be used for the imprint steps over a number of times. Further, the imprint process brings about a higher throughput. Therefore, the cost for manufacturing the media can be reduced. Moreover, since the magnetic marks in the servo regions and the discrete tracks in the data regions can be formed at the same time, it is expected that accuracy in positions of the servo regions and the discrete tracks can be improved. Incidentally, in order to improve the recording density, it is advantageous that the imprint lithograph method should be applied to the manufacture of a perpendicular magnetic recording media.

However, when the magnetic recording media is manufactured by using the imprint lithography method, the thickness of the magnetic film may be made unevenly, depending on the pattern in the servo regions. As a result of this, it has become a problem that read and write of the magnetic data may be made unstable.

BRIEF SUMMARY OF THE INVENTION

A magnetic recording media according to an aspect of the present invention comprises: a servo region including a preamble region and a burst region, and having marks of a magnetic film; and a data region having discrete tracks of the magnetic film; the burst region including a signal section and a non-signal section, the signal section including first marks of the magnetic film formed in a periodic pattern in a track direction, and the non-signal section including second marks of the magnetic film having a pattern different from the pattern of the first marks in the signal section.

A method of manufacturing a magnetic recording media according to another aspect of the present invention comprises: depositing a magnetic film on a substrate, and applying a resist to the magnetic film; pressing an imprint stamper on the resist to imprint a pattern of projections and recesses corresponding to a pattern of the marks in the servo region and the data region of the magnetic recording media described above; and processing the magnetic film using the imprinted resist as a mask.

A magnetic recording apparatus according to still another aspect of the present invention comprises: the magnetic recording media described above; and a magnetic head configured to write to and read from the magnetic recording media.

BRIEF DESCRIPTION OF THE SEVERAL VIEWS OF THE DRAWING

FIGS. 2A to 2D are cross-sectional views illustrating a possible problem that can occur in manufacturing the discrete track media shown in FIG. 1;

FIGS. 3A and 3B are cross-sectional views illustrating a possible problem that can occur in manufacturing the discrete track media shown in FIG. 1;

DETAILED DESCRIPTION OF THE INVENTION

Embodiments of the magnetic recording media according to the present invention will now be described with reference to accompanying drawings. Techniques to be compared to the embodiments of the present invention will also be described.

Figure 1A:
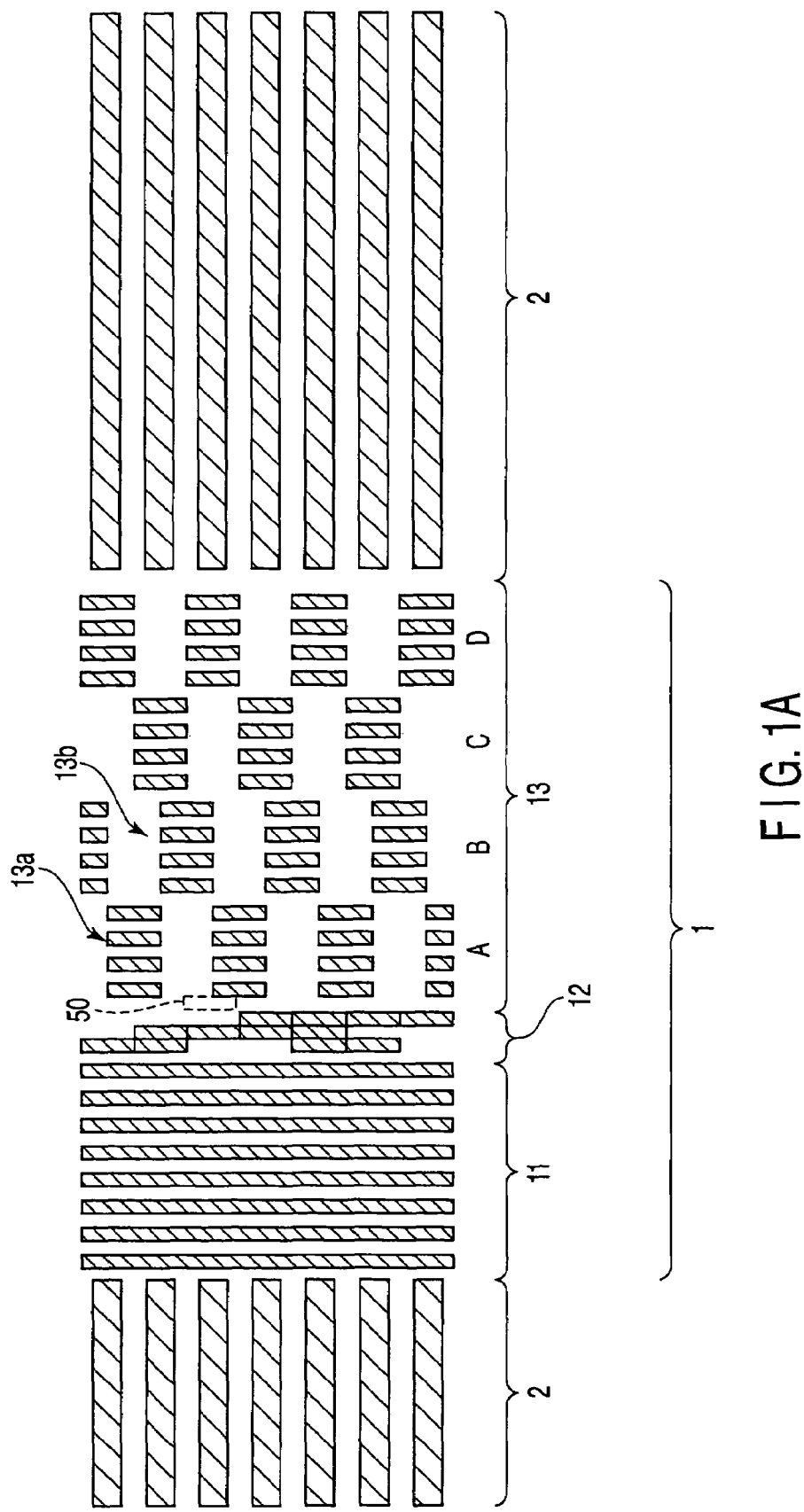
FIG. 1A is a plan view of a discrete track media that is supposed to be manufactured using the imprint lithography method.
Figure 1B:
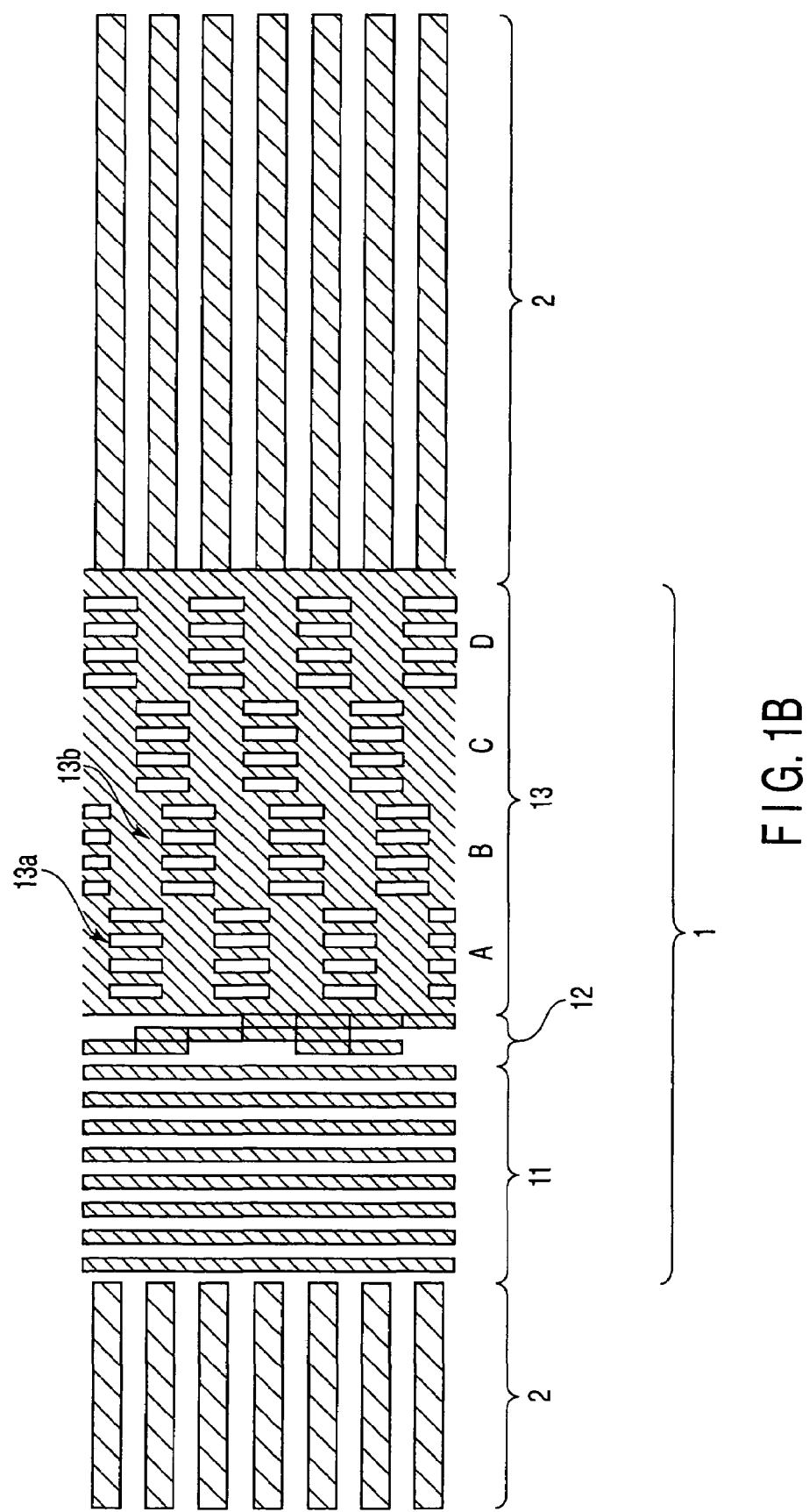
FIG. 1B is a plan view of another discrete track media that is supposed to be manufactured using the imprint lithography method.

FIGS. 1A and 1B show plan views of magnetic recording media (discrete track media) that are supposed to be manufactured using the imprint lithography method. As shown in FIGS. 1A and 1B, these magnetic recording media include a servo region 1 in which marks of a magnetic film are formed and a data region 2 in which discrete tracks of the magnetic film are formed. The servo region 1 includes a preamble region 11, an address region 12 and a burst region (a positioning burst region) 13. The burst region 13 may include rectangular magnetic marks or may include rectangular hole marks formed in a magnetic film. However, the signal pattern of the burst region either in the media of FIG. 1A or in the media of FIG. 1B has a same function for a magnetic recording apparatus. For convenience, the burst pattern shown in FIG. 1A is referred to as a "mark-type", and the burst pattern shown in FIG. 1B is referred to as a "hole-type" herein. It should be noted that recesses between the magnetic marks may be filled with a non-magnetic film or may be left unfilled. The following will be described for the embodiments that the recesses between the magnetic marks are filled with a non-magnetic film. In a perpendicular magnetic recording media, the magnetic marks are magnetized in the perpendicular direction in advance.

The preamble region 11 is read out by the magnetic head 50 prior to the address region 12 and the burst region 13, and the data read out from this region are used to adjust the amplification factor of the signal amplifier to maintain a given amplitude. The preamble region 11 has such a pattern that a plurality of linear marks of the magnetic film extend in the track width direction (that is, the radial direction of the disk). This pattern makes it possible to generate similar signals regardless of the positions of the magnetic head 50.

The address region 12 has track data and sector data. The track data are written in gray code so that they can be read with the magnetic head 50 in seeking.

The burst region 13 is provided for positioning the magnetic head 50 to the center of a predetermined track. The burst region 13 includes signal sections 13a and non-signal sections 13b. Each signal section 13a in FIG. 1A includes rectangular marks of the magnetic film and spaces filled with the non-magnetic film between the marks which are formed with the same intervals in the track direction, i.e., the circumferential direction of the disk. Each non-signal section 13b in FIG. 1A has no magnetic mark and includes the non-magnetic film alone. Each signal section 13a in FIG. 1B also includes rectangular marks and spaces similar to those in FIG. 1A. On the other hand, each non-signal section 13b in FIG. 1B includes the magnetic film alone. The burst region 13 in FIG. 1A or 1B has a pattern similar to that of a burst region in a conventional magnetic recording media, which is magnetically recorded with a servo track writer. The signal section 13a includes burst A to burst D that are located at positions relatively different from each other with respect to the center of the track. When the magnetic head 50 traces the burst region 13, the intensity of the readout signals varies in accordance with the displacement of the magnetic head 50 from the center of the track. More specifically, when the center of the magnetic head 50 coincides with the center of the track, the intensities of the signals obtained from the burst A and burst B are equal to each other. On the other hand, for example, when the magnetic head 50 is displaced toward the burst A, the signal intensity from the burst A becomes higher and that from the burst B becomes lower. Thus, the position of the head with respect to the center of the track can be calculated based on the readout signals from the burst region, and the magnetic head 50 can be positioned to the center of the track by feedback control.

Here, an example of the area ratios of the magnetic marks in individual regions of the magnetic recording media will be described. In the preamble region 11, linear magnetic marks and spaces filled with the non-magnetic film between the marks are formed with the same intervals in the track direction. With this arrangement, the area ratio of the magnetic marks in the preamble region 11 is about 50%. In the address region 12, the pattern of the magnetic marks varies depending on the value of the address. Accordingly, the area ratio of the magnetic marks varies depending on the address. The burst region 13 in FIG. 1A includes the signal section 13a, in which rectangular magnetic marks and spaces filled with the non-magnetic film between the marks are formed with the same intervals in the track direction, and the non-signal section having no magnetic mark and including the non-magnetic film alone. With this arrangement, the area ratio of the magnetic marks in the burst region 13 is about 25%. On the other hand, the burst region 13 in FIG. 1B includes the signal section 13a similar to that in FIG. 1A and the non-signal section including the magnetic film alone. With this arrangement, the area ratio of the magnetic marks in the burst region 13 is about 75%. The area ratio of the magnetic discrete track in the data region 2 is set to about 67%.

To summarize, the area ratios of the magnetic marks in respective regions of the magnetic recording media shown in FIG. 1A (or FIG. 1B) are: about 50% for the preamble region 11, about 25% for the mark-type burst region 13 (or about 75% for the hole-type burst region 13), and about 67% for the data region. In the case where the magnetic recording media having such a structure is manufactured using the imprint lithography method, an imprint stamper having recesses corresponding to the magnetic marks and projections corresponding to the non-magnetic spaces is used. Therefore, the imprint stamper used for the manufacture of the above magnetic recording media has area ratios of the projections substantially reverse to those of the magnetic marks in the media, that is, about 50% for the preamble portion, about 75% (or about 25%) for the burst portion, and about 33% for the data region. It should be noted that the imprint stamper is manufactured by, for example, processes including the electron beam lithography as described above, and therefore the height of the projections is at constant in any region.

With reference to FIGS. 2A to 2D, a problem which may possibly arise when the magnetic recording media having the structure shown in FIG. 1 is manufactured using the imprint stamper, will be described. For the purpose of making the problem clear, two adjacent regions of the imprint stamper 20, having area ratios of the projections significantly different from each other, are shown in FIGS. 2A to 2D.

FIG. 2A shows a state in which the resist 33 is applied to the magnetic film 32 formed on the substrate 31, and the imprint stamper 20 is placed to face the resist 33. In this imprint stamper 20, the area ratio of the projections is relatively lower in the region on the left, whereas the area ratio of the projections is relatively higher in the region on the right.

FIG. 2B shows an initial stage of the imprint process in which the imprint stamper 20 is pressed against the resist 33 by applying a pressure. The projections of the imprint stamper 20 are pushed into the resist 33, and a part of the resist which is pushed aside by the projections enters the recesses of the imprint stamper 20. In the region having a higher area ratio of the projections, such as shown in the right of FIG. 2B, the recesses of the imprint stamper 20 are filled with a part of the resist pushed aside by the projections at this stage. The resist has high viscosity and therefore it cannot move for a long distance during the imprinting process. For this reason, even if a further pressure is applied at this stage, it is no longer possible to increase the imprint depth by pushing the projections into the resist in the right region. By contrast, in the region having a lower area ratio of the projections, such as shown in the left of FIG. 2B, the amount of the resist that is pushed aside by the projections is not much, and the recesses of the imprint stamper 20 are not completed filled with the resist. Therefore, when a further pressure is applied at this stage, the projections of the imprint stamper 20 in the left region can be pushed further into the resist.

FIG. 2C shows a final stage of the imprint process. As shown in this figure, the state of the right region is not different from that of FIG. 2B. In the left region, however, the projections are pushed further into the resist from the state shown in FIG. 2B, increasing the imprint depth. As a result, distortion is produced in the intermediate region between the right and the left regions of the imprint stamper 20. At this stage, even in the left region, the recesses of the imprint stamper 20 are completely filled with a part of the resist pushed aside. Therefore, if a further pressure is applied to the imprint stamper 20, the projections can no longer be pushed into the resist in any of the regions. Thus, at the point where the imprint depth can no longer be increased, the imprint process is finished.

FIG. 2D shows a state of the resist after the imprint stamper 20 has been removed. Because imprint depths have been different in the right and the left regions of the imprint stamper 20 as described above, it is natural that the thicknesses of the resist residue remaining on the magnetic film 32 are different between the right region and the left region.

If etching is carried out to process the magnetic film using the resist 33 as a mask, to which the projections and recesses have been transferred, the thicknesses of the magnetic film 32 thus processed become uneven due to the difference in the thicknesses of the resist residue. More specifically, in the left region shown in FIG. 2D, the thickness t1 of the resist residue is small, and therefore the etching depth of the magnetic film 32 becomes relatively deep. By contrast, in the right region shown in FIG. 2D, the thickness t2 of the resist residue is large, and therefore the etching depth of the magnetic film 32 becomes relatively shallow.

The design of the imprint stamper 20 used in the case where a magnetic recording media having the mark-type burst structure shown in FIG. 1A is manufactured using the imprint lithography method as described above will be specifically described. The imprint stamper 20 to be used in this case has the following area ratios of the projections: that is, about 50% for the preamble portion 20a, about 75% for the burst portion 20b, and about 33% for the data portion 20c, as indicated in FIG. 3A. For the sake of simplification, the pattern of the projections is not illustrated in the imprint stamper 20 shown in the figure. Since the area of the address region is small as compared to that of the preamble region, burst region or data region, the imprint depth in the address region becomes a level close to the imprint depth in the preamble region or the burst region. Therefore, the address region is not illustrated in this figure.

FIG. 3B shows the imprint depths to the resist 33 by the projections of the imprint stamper 20 in the preamble portion 20a, burst portion 20b and data portion 20c. As shown in this figure, in accordance with the area ratios of the projections, the imprint depth is largest in the data portion 20c, it is smallest in the burst portion 20b, and it is at an intermediate level between them in the preamble portion 20b. As a result, the thickness of the resist residue is smallest in the data region, it is largest in the burst region, and it is at an intermediate level between them in the preamble portion.

If etching is carried out using the resist 33 as a mask, to which the projections and recesses have been transferred, the etching depth in the magnetic film 32 is largest in the data region, it is smallest in the burst region, and it is at an intermediate level between them in the preamble portion. Therefore, after the etching, the thickness of the magnetic film 32 is smallest in the data region, it is largest in the burst region, and it is at an intermediate level between them in the preamble portion. In the magnetic recording media in which the thicknesses of the magnetic film 32 vary as described above, the signal intensity and recording characteristics vary in accordance with the thickness of the magnetic film 32. Thus, it is difficult to perform stable read and write. The same problem also arises in the magnetic recording media having the hole-type burst structure.

By contrast, in the magnetic recording media according to embodiments of the present invention, marks of the magnetic film are formed in the non-signal section of the burst region. When the marks of the magnetic film are formed in the non-signal section of the burst region as described above, the difference in the area ratios of the magnetic marks is preferably made as small as possible between the servo region (including the preamble region and burst region) and the data region. For example, it is preferable that the area ratio of the magnetic marks in the burst region should be set to an intermediate level between that in the preamble region and that in the data region.

First Embodiment

Figure 4:
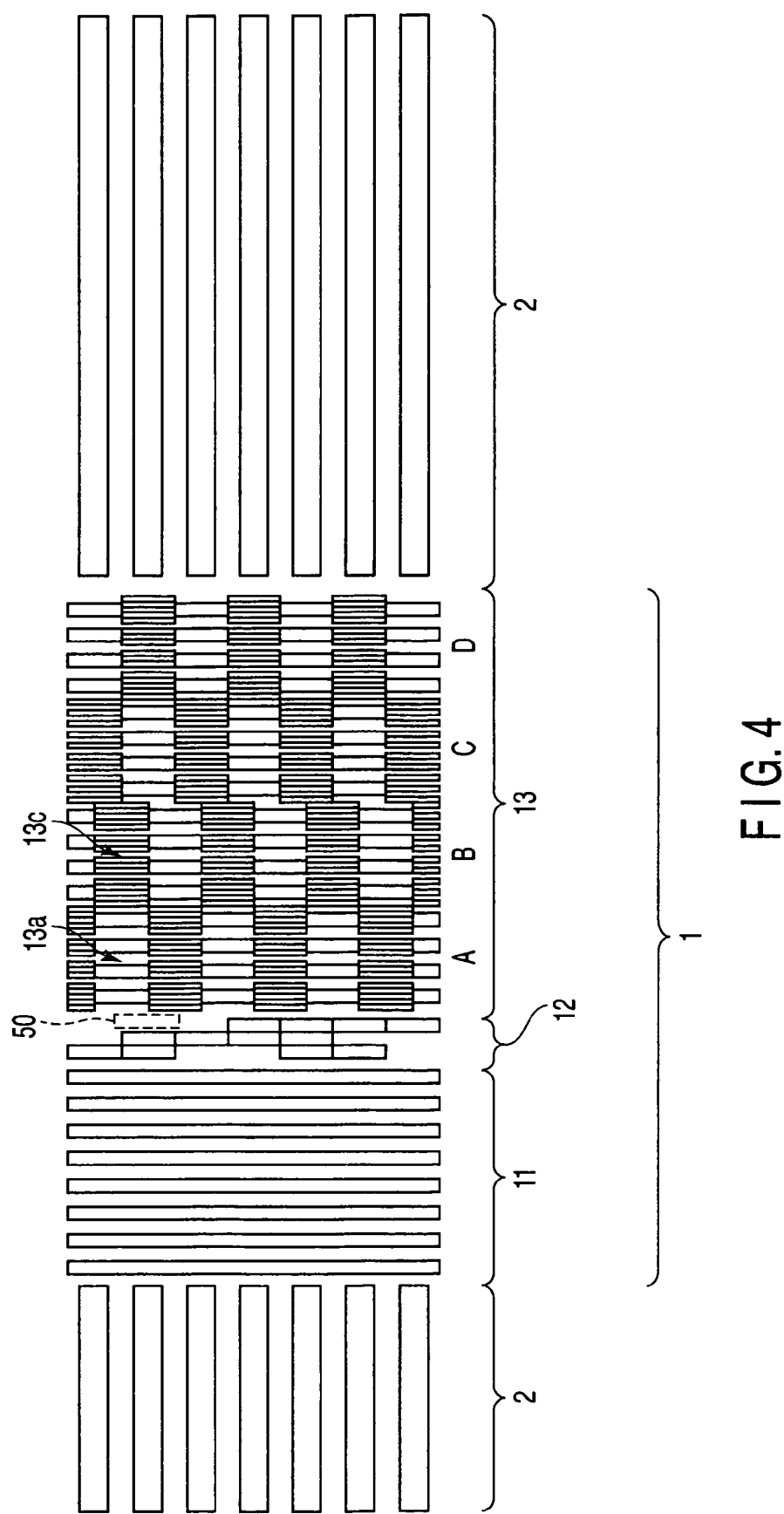
FIG. 4 is a plan view showing a magnetic recording media according to the first embodiment.

FIG. 4 is a plan view of the magnetic recording media according to this embodiment. As shown in this figure, the magnetic recording media includes the servo region 1 in which marks of a magnetic film are formed, and the data region 2 in which discrete tracks of the magnetic film are formed. The servo region 1 includes the preamble region 11, the address region 12 and the burst region 13.

In the preamble region 11, linear magnetic marks and spaces filled with the non-magnetic film between the marks are formed with the same intervals in the track direction. With this arrangement, the area ratio of the magnetic marks in the preamble region 11 is about 50%. In the address region 12, the pattern of the magnetic marks varies depending on the value of the address. Accordingly, the area ratio of the magnetic marks varies depending on the address. The area ratio of the magnetic discrete track in the data region 2 is set to about 67%. These regions are the same as those shown in FIG. 1.

The burst region 13 shown in FIG. 4 includes a signal section 13a and a non-signal section 13c, and the lengths of the signal section 13a and non-signal section 13c are the same in the track direction. In each signal section 13a, four rectangular marks (four first marks) of the magnetic film and spaces filled with the non-magnetic film between the marks are formed with the same intervals in the track direction. The signal section 13a includes burst A to burst D that are located at positions relative different from each other with respect to the center of the track. The signal section 13a has the same structure as the signal section shown in FIG. 1. On the other hand, in the non-signal section 13c, eleven rectangular marks (eleven second marks) of the magnetic film, in-plane geometry of which is a rectangle, and spaces filled with the non-magnetic film between the marks are formed periodically with the same intervals in the track direction. The pitch of the rectangular magnetic marks in the non-signal section 13c is different from the pitch of the rectangular magnetic marks in the signal section 13a. In both of the signal section 13a and the non-signal section 13c of the burst region 13, the rectangular magnetic marks and the non-magnetic spaces between them are formed with the same intervals in the track direction, respectively. Therefore, with this arrangement, the area ratio of the magnetic marks is about 50% in the burst region.

As described above, in the magnetic recording media shown in FIG. 4, the area ratios of the magnetic marks are: about 50% for the preamble region 11, about 50% for the burst region 13, and about 67% for the data region 2. Thus, the difference in the area ratios is relatively small. In the imprint stamper used for the manufacture of the above magnetic recording media, the area ratios of the projections are: about 50% for the preamble portion, about 50% for the burst portion, and about 33% for the data portion. Since the difference in the area ratios of the projections between respective portions is relatively small in this imprint stamper, it is possible to reduce the difference in thicknesses of the resist residue after imprinting. Therefore, magnetic marks almost uniform in thickness can be formed by etching the magnetic film using this resist as a mask. Since the burst region in this embodiment includes periodically formed magnetic marks either in the signal section 13a or in the non-signal section 13b, there is no distinction between the mark-type and the hole-type.

Using a magnetic recoding apparatus comprising the magnetic recording media in this embodiment and an ordinary magnetic head, read and write can be performed. Burst signals obtained from the magnetic recording media shown in FIG. 4 will be described. As described above, four rectangular magnetic marks are arranged in the signal section 13a of the burst region 13 and eleven rectangular magnetic marks are arranged in the non-signal section 13c, and thus the pitches of the rectangular marks in these two regions are different from each other. In this case, the frequency of signals obtained from the signal section 13a is 4x (where x is a constant) Hz, whereas the frequency of signals obtained from the non-signal section 13c is 11x Hz. Therefore, only the signals having a frequency component from the signal section 13a can be detected by cutting off the signals having a frequency component from the non-signal section 13c.

Further, since the magnetic recording media according to the embodiment of the present invention comprises magnetic marks almost uniform in thickness as described above, stable read and write can be realized.

Second Embodiment

Figure 5:
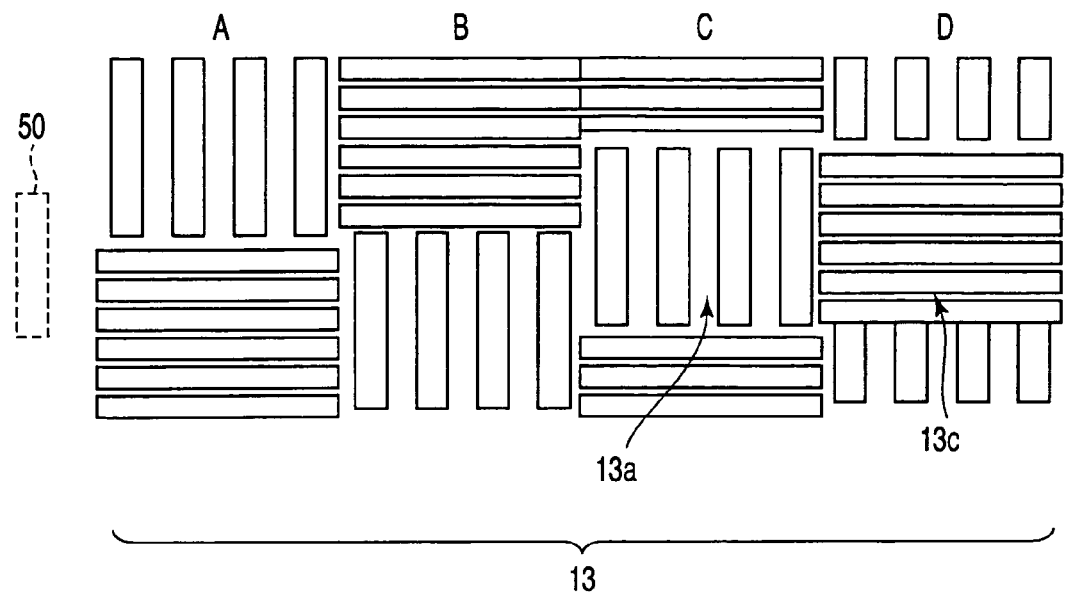
FIG. 5 is a plan view showing a burst region of a magnetic recording media according to the second embodiment.

FIG. 5 is a plan view of a burst region of the magnetic recording media in this embodiment. The non-signal section 13c in the burst region 13 shown in FIG. 5 includes a plurality of linear marks of the magnetic film, in-plane geometry of which is a stripe parallel to the track direction. The rest of the structure is similar to that shown in FIG. 4. It should be noted that the pitch in the track width direction of the linear marks (second marks) formed in the non-signal section 13c shown in FIG. 5 is not particularly limited. In this embodiment, the width of each linear magnetic mark and the width of each non-magnetic space between the linear marks are set to a ratio of 3 to 1. Thus, the area ratio of the magnetic marks in the non-signal section 13c is about 75%. Consequently, the area ratio of the magnetic marks in the burst region 13 becomes about 63%.

In the magnetic recording media shown in FIG. 5, the area ratios of the magnetic marks are: about 50% for the preamble region 11, about 63% for the burst region 13, and about 67% for the data region 2. Thus, the difference in the area ratios is relatively small. Consequently, this embodiment also produces advantages similar to those in the first embodiment.

Third Embodiment

Figure 6:
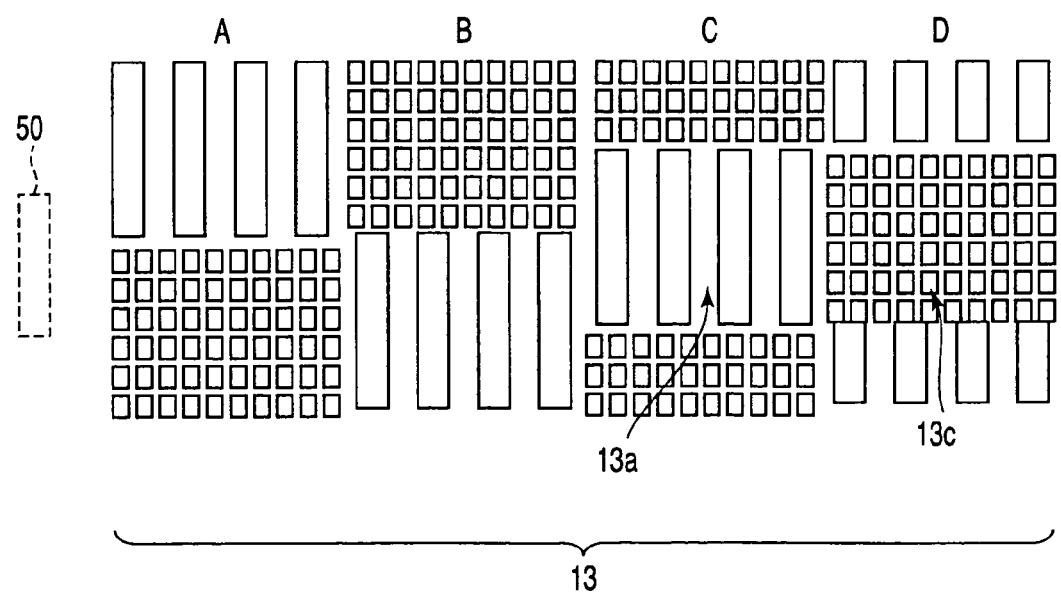
FIG. 6 is a plan view showing a burst region of a magnetic recording media according to the third embodiment.

FIG. 6 is a plan view of a burst region of the magnetic recording media in this embodiment. The non-signal section 13c in the burst region 13 shown in FIG. 6 includes a plurality of dot marks of the magnetic film, in-plane geometry of which is a dot, formed in a periodic pattern. The pitch of the dot magnetic marks (second marks) in the non-signal section 13c is different from the pitch of the rectangular magnetic marks (first marks) in the signal section 13a. The rest of the structure is similar to that shown in FIG. 4. It should be noted that the pitch in the track width direction of the dot marks formed in the non-signal section 13c shown in FIG. 6 is not particularly limited. In this embodiment, the width of each dot magnetic mark and the width of each non-magnetic space between the dot marks are set to a ratio of 3 to 1 in the track direction and a ratio of 3 to 1 in the track width direction. Thus, the area ratio of the magnetic marks in the non-signal section 13c is about 56%. Consequently, the area ratio of the magnetic marks in the burst region 13 becomes about 54%.

In the magnetic recording media shown in FIG. 6, the area ratios of the magnetic marks are: about 50% for the preamble region 11, about 54% for the burst region 13, and about 67% for the data region 2. Thus, the difference in the area ratios is relatively small. Further, the pitch of the dot magnetic marks in the non-signal section 13c is different from the pitch of the rectangular magnetic marks in the signal section 13a. Therefore, only the signals having a frequency component from the signal section 13a can be detected by cutting off the signals having a frequency component from the non-signal section 13c. Consequently, this embodiment also produces advantages similar to those in the first embodiment.

It should be noted that with regard to the media shown in FIGS. 4 to 6, the area ratio of the magnetic marks in the entire burst region 13 can be adjusted by appropriately setting the width of each magnetic mark and the width of each non-magnetic space between the marks in the non-signal section 13c of the burst region 13.

It should also be noted that the structure of the non-signal section 13c in the burst region 13 is not limited to those shown in FIGS. 4 to 6. For example, it is possible to form the magnetic film on the entire surface of the non-signal section 13c in the burst region 13. In this case, the area ratio of the magnetic marks in the entire burst region 13 becomes about 75%.

Next, a method of manufacturing a magnetic recording media according to an embodiment of the present invention will be described with reference to FIGS. 7A to 7G.

Figure 7A:
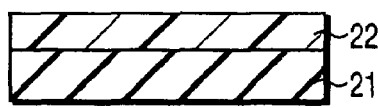
FIGS. 7A to 7G are cross-sectional views illustrating a method of manufacturing a magnetic recording media according to an embodiment of the present invention.
Figure 7E:
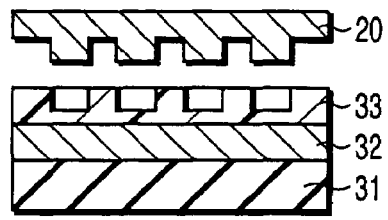
Figure 7B:
Figure 7F:
Figure 7C:

First, an imprint stamper is manufactured as described below. As shown in FIG. 7A, the electron beam resist 22 is applied to the master plate 21. It is preferable that the master plate 21 be made of silicon or glass. As shown in FIG. 7B, the electron beam resist 22 is subjected to electron beam direct write, and then is developed to form a pattern of projections and recesses therein. As shown in FIG. 7C, the master plate 21 having the electron beam resist 22 on which the pattern of the projections and recesses is formed is subjected to electroforming, and then the metal disk formed by electroforming is peeled off. Thus, the imprint stamper 20 is manufactured. As the material for the stamper, Ni is preferable, although it is not particularly limited.

Projections having a reverse pattern to the pattern of the magnetic marks in the magnetic recording media shown in FIG. 4, for example, are formed in the surface of the imprint stamper 20. In this case, the area ratios of the projections on the imprint stamper 20 are: about 50% for the preamble portion, about 50% for the burst portion, and about 33% for the data portion.

It should be noted that the imprint stamper can be manufactured by etching the master plate 21 after the step shown in FIG. 7B using the resist pattern as a mask, thereby transferring the pattern of the projections and recesses in the resist to the master plate 21.

Figure 7G:
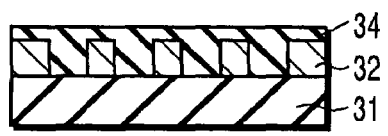
Figure 7D:
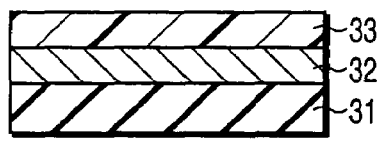

Next, a magnetic recording media is manufactured by using the imprint lithography method as described below. As shown in FIG. 7D, the magnetic film 32 suitable for perpendicular recording is formed on the substrate 31. Here, it is preferable that a soft magnetic underlayer and a ferromagnetic recording layer be formed as the magnetic film 32 to form a perpendicular two-layered media. The resist 33 for imprinting is applied to the magnetic film 32. As shown in FIG. 7E, the stamper 20 is placed to face the resist 33 on the substrate 31, and the stamper 20 is pressed against the resist 33 by applying a pressure to transfer the pattern of the projections on the surface of the stamper 20 onto the surface of the resist 33. After that, the stamper 20 is removed. As shown in FIG. 7F, etching of the magnetic film 32 is performed to process the magnetic film 32 using the resist 33, on which the pattern of the projections and recesses is formed, as a mask. As a result, a pattern of the magnetic marks as shown in FIG. 4 is formed. The area ratios of the magnetic marks are: about 50% for the preamble region, about 50% for the burst region, and about 67% for the data region. As shown in FIG. 7G, the carbon protective film 34 is formed on the magnetic film 32, and further a lubricant is applied thereon, and thus the magnetic recording media is manufactured.

In the case where the imprint stamper 20 is used, in which the difference in the area ratios of the projections between the respective portions is small, the difference in the thicknesses of the resist residue after imprinting can be reduced to a low level. Therefore, using such a resist as a mask in the etching of the magnetic film, magnetic marks almost uniform in thickness can be formed.

Figure 8A:
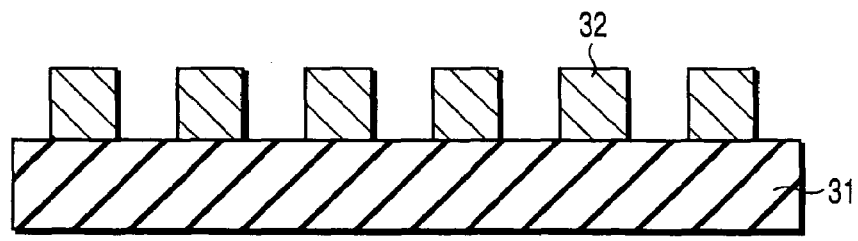
FIG. 8A is a cross-sectional view of a magnetic film having magnetic marks shown in FIG. 4.
Figure 8B:
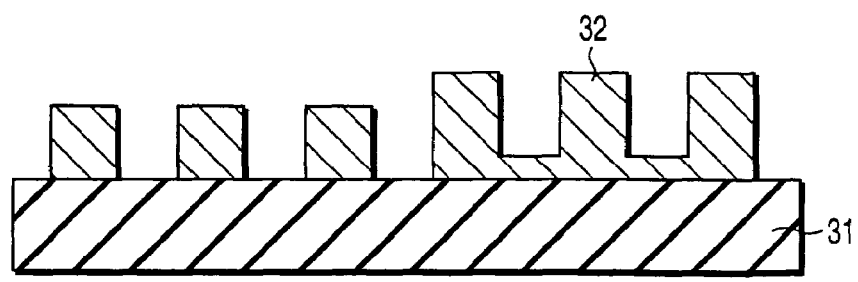
FIG. 8B is a cross-sectional view of a magnetic film having magnetic marks shown in FIG. 1A.

FIG. 8A shows a cross-sectional view of the magnetic film having a pattern of the magnetic marks shown in FIG. 4, and FIG. 8B shows a cross-sectional view of the magnetic film having a pattern of the magnetic marks shown in FIG. 1A. In the case of the magnetic film shown in FIG. 8A (an embodiment according to the present invention), the thicknesses of the magnetic marks 32 after processing are substantially uniform. This is because the difference in the area ratios of the projections between the respective portions in the imprint stamper is small and the thicknesses of the resist residue after imprinting is substantially uniform in any portion on the media. By contrast, in the case of the magnetic film shown in FIG. 8B (a comparative example), the thicknesses of the magnetic marks 32 after processing are uneven. This is because the difference in the area ratios of the projections between the respective portions in the imprint stamper is large and the thicknesses of the resist residue after imprinting are uneven depending on the portions on the media. If the media shown in FIG. 8B is employed, problems such as vibration of the head and recording failure arise in some cases, whereas such problems never arise with the media shown in FIG. 8A.

Next, a substrate-patterned discrete track media according to another embodiment of the present invention will be described. The substrate-patterned discrete track media also provides the same effect as that of the magnetic film-patterned discrete track media that has been described with referring to FIGS. 7A to 7G. In the substrate-patterned discrete track media, a magnetic film on a projection and a magnetic film in a recess correspond to a magnetic mark and a non-magnetic film, respectively. A method of manufacturing a substrate-patterned discrete track media will be described with reference to FIGS. 9A to 9G.

Figure 9A:
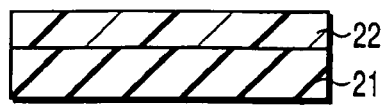
FIGS. 9A to 9G are cross-sectional views illustrating a method of manufacturing a magnetic recording media according to another embodiment of the present invention.
Figure 9B:
Figure 9C:

Processed for manufacturing an imprint stamper shown in FIGS. 9A to 9C are similar to those in FIGS. 7A to 7C.

Figure 9E:
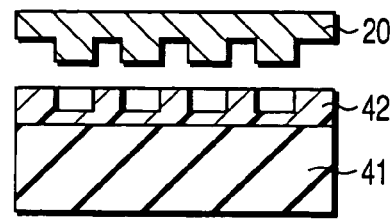
Figure 9F:
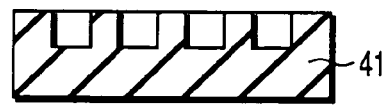
Figure 9G:
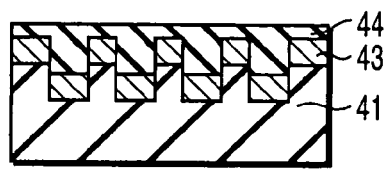
Figure 9D:
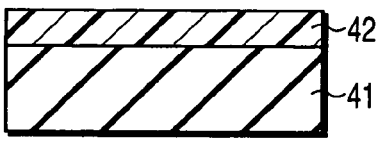

Next, a substrate having projections and recesses processed on the surface thereof is manufactured by using the imprint lithography method as described below. As shown in FIG. 9D, the resist 42 for imprinting is applied to the substrate 41. As shown in FIG. 9E, the stamper 20 is placed to face the resist 42 on the substrate 41, and the stamper 20 is pressed against the resist 42 by applying a pressure to transfer the pattern of the projections on the surface of the stamper 20 onto the surface of the resist 42. After that, the stamper 20 is removed. As shown in FIG. 9F, etching of the substrate 41 is performed using the resist 42, on which the pattern of the projections and recesses is formed, as a mask. As a result, a pattern of the projections corresponding to the magnetic marks shown in FIG. 4 is formed on the surface of the substrate 41. The area ratios of the projections are: about 50% for the preamble region, about 50% for the burst region, and about 67% for the data region. As shown in FIG. 9G, the magnetic film 43 suitable for perpendicular recording on the projections and in the recesses of the substrate 41. Here, it is preferable that a soft magnetic underlayer and a ferromagnetic recording layer be formed as the magnetic film 43 to form a perpendicular two-layered media. The carbon protective film 44 is formed on the magnetic film 43, and further a lubricant is applied thereon, and thus the magnetic recording media is manufactured.

In the case where the imprint stamper 20 is used, in which the difference in the area ratios of the projections between the respective portions is small, the difference in the thicknesses of the resist residue after imprinting can be reduced to a low level. Therefore, using such a resist as a mask in the etching of the substrate, projections almost uniform in height can be formed.

Figure 10A:
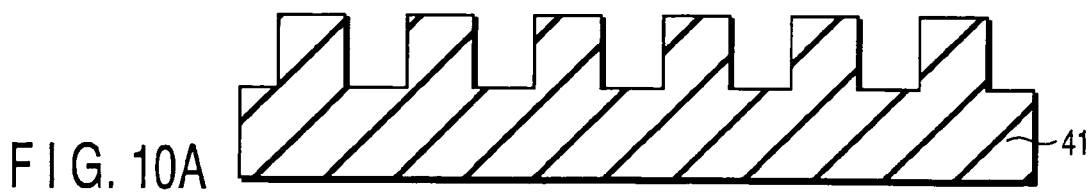
FIG. 10A is a cross-sectional view of a substrate of a substrate-patterned discrete media corresponding to FIG. 4.
Figure 10B:
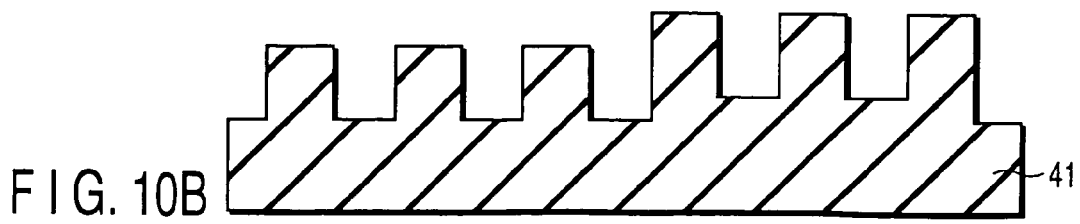
FIG. 10B is a cross-sectional view of a substrate of a substrate-patterned discrete media corresponding to FIG. 1A.

FIG. 10A shows a cross-sectional view of the substrate-patterned discrete track media corresponding to FIG. 4, and FIG. 10B shows a cross-sectional view of the substrate-patterned discrete track media corresponding to FIG. 1A. In the case of FIG. 10A (an embodiment according to the present invention), the heights of the projections of substrate 41 after processing are substantially uniform. This is because the difference in the area ratios of the projections between the respective portions in the imprint stamper is small and the thicknesses of the resist residue after imprinting is substantially uniform in any portion on the substrate. By contrast, in the case of FIG. 10B (a comparative example), the heights of the projections of the substrate 41 after processing are uneven. This is because the difference in the area ratios of the projections between the respective portions in the imprint stamper is large and the thicknesses of the resist residue after imprinting are uneven depending on the portions on the substrate. If the media manufactured by use of the substrate shown in FIG. 10B is employed, problems such as vibration of the head and recording failure arise in some cases, whereas such problems never arise with the media manufactured by use of the substrate shown in FIG. 10A.

Figure 11:
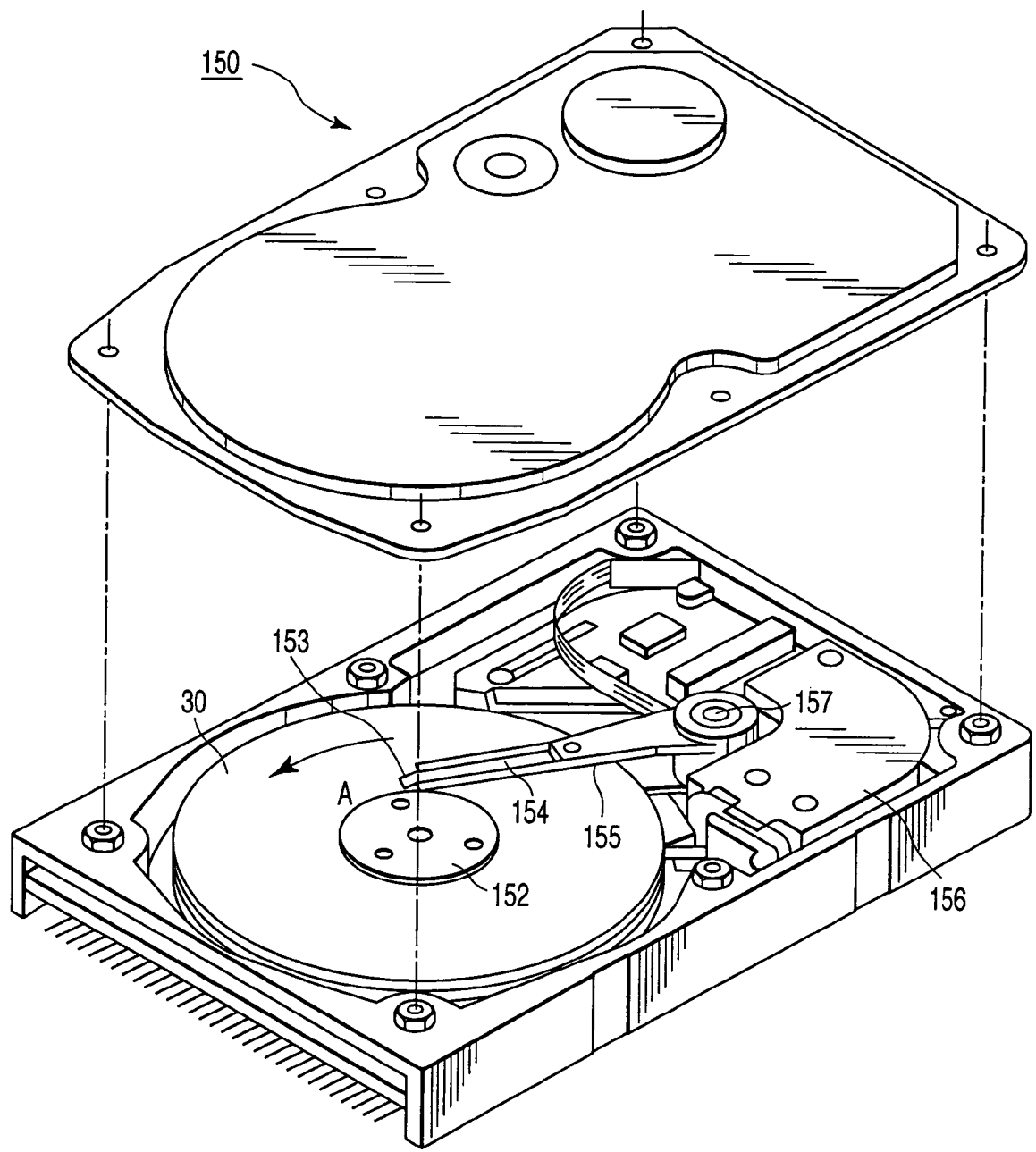
FIG. 11 is a perspective view of a magnetic recording apparatus according to an embodiment of the present invention.

Next, with reference to FIG. 11, a magnetic recording apparatus according to an embodiment of the present invention will be described. The magnetic recording apparatus 150 is of a type that uses a rotary actuator. In this figure, the magnetic disk 30 having such a pattern of magnetic marks as shown in any one of FIGS. 4 to 6, is mounted to the spindle 152, and it is rotated in the direction indicated by arrow A by a motor (not shown) which operates in reply to control signals output from a driver controller (not shown). The magnetic recording apparatus 150 may have a plurality of magnetic disks 30.

The head slider 153 used to write to and read from data stored in the magnetic disk 30 is mounted on a tip end of the suspension 154. The suspension 154 is connected to an end of the actuator arm 155. The voice coil motor 156, a type of a linear motor, is provided at the other end of the actuator arm 155. The voice coil motor 156 comprises a driving coil (not shown) wound around a bobbin portion and a magnetic circuit made of a permanent magnet and a counter-yoke arranged with sandwiching the coil therebetween. The actuator arm 155 is supported by ball bearings (not shown) provided at upper and lower portions of the pivot 157, and thus the arm 155 is set rotatable by the voice coil motor 156.

As the magnetic disk 30 is rotated, the surface (ABS) of the head slider 153 that faces the media is held to have a certain flying height from the surface of the magnetic disk 30. It should be noted that the slider may be of a so-called "in-contact type", which is brought into contact with the magnetic disk 30.

Since the magnetic marks in the magnetic disk 30 is formed to have substantially uniform thicknesses, the magnetic recording apparatus according to the embodiments of the present invention can perform stable read and write.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A magnetic recording media, comprising:
    a servo region including a preamble region and a burst region, and having marks of a magnetic film; and
    a data region having discrete tracks of the magnetic film,
    the burst region including a signal section and a non-signal section, the signal section including first marks of the magnetic film formed in a periodic pattern in a track direction, and the non-signal section including second marks of the magnetic film having a pattern different from the pattern of the first marks in the signal section, wherein a size in a track width direction of each second mark is substantially identical to that of each first mark.

2. The magnetic recording media according to claim 1, wherein the first marks of the magnetic film included in the signal section are rectangular marks, in-plane geometry of which is a rectangle, formed in the periodic pattern in the track direction.

3. The magnetic recording media according to claim 2, wherein the non-signal section includes the second marks of the magnetic film, in-plane geometry of which is a rectangle, formed in a periodic pattern in the track direction, and
    wherein a pitch of the second marks of the magnetic film in the non-signal section is different from a pitch of the first marks of the magnetic film in the signal section.

4. The magnetic recording media according to claim 1, wherein an area ratio of magnetic marks in the burst region is set at an intermediate value between an area ratio of the magnetic marks in the preamble region and the area ratio of the discrete tracks in the data region.

5. A method of manufacturing a magnetic recording media, comprising:
    depositing a magnetic film on a substrate, and applying a resist to the magnetic film;
    pressing an imprint stamper on the resist to imprint a pattern of projections and recesses corresponding to a pattern of marks in a servo region and a data region of the magnetic recording media according to claim 1; and
    processing the magnetic film using the imprinted resist as a mask.

6. The method according to claim 5, wherein the imprint stamper is formed by electroforming.

7. A method of manufacturing a magnetic recording media, comprising:
    applying a resist to a substrate;

pressing an imprint stamper on the resist to imprint a pattern of projections and recesses corresponding to a pattern of marks in a servo region and a data region of the magnetic recording media according to claim 1; and processing the substrate using the imprinted resist as a mask, followed by depositing a magnetic film.

8. The method according to claim 7, wherein the imprint stamper is formed by electroforming.

9. A magnetic recording apparatus, comprising:

a magnetic recording media; and a magnetic head configured to write to and to read from the magnetic recording media, the magnetic recording media including a servo region including a preamble region and a burst region, and having marks of a magnetic film; and a data region having discrete tracks of the magnetic film, the burst region including a signal section and a non-signal section, the signal section including first marks of the magnetic film formed in a periodic pattern in a track direction, and the non-signal section including second marks of the magnetic film having a pattern different from the pattern of the first marks in the signal section, wherein a size in a track width direction of each second mark is substantially identical to that of each first mark.

10. The magnetic recording apparatus according to claim 9, wherein the first marks of the magnetic film included in the signal section are rectangular marks, in-plane geometry of which is a rectangle, formed in the periodic pattern in the track direction.

11. The magnetic recording apparatus according to claim 10, wherein the non-signal section includes the second marks of the magnetic film, in-plane geometry of which is a rectangle, formed in a periodic pattern in the track direction, and wherein a pitch of the second marks of the magnetic film in the non-signal section is different from a pitch of the first marks of the magnetic film in the signal section.

12. The magnetic recording apparatus according to claim 9, wherein an area ratio of magnetic marks in the burst region is set at an intermediate value between an area ratio of the magnetic marks in the preamble region and the area ratio of the discrete tracks in the data region.

13. The magnetic recording apparatus according to claim 9, wherein signals from the second marks in the non-signal section are cut-off from signals from the first marks in the signal section based on frequency.

* * * * *